(12) United States Patent
Voss et al.

(10) Patent No.: US 8,955,394 B2
(45) Date of Patent: Feb. 17, 2015

(54) DEVICE FOR MEASURING THE TORQUE, THE DIRECTION OF ROTATION AND THE SPEED OF ROTATION OF A SHAFT OF A TRANSMISSION, IN PARTICULAR AN OUTPUT SHAFT OF AN AZIMUTH TRANSMISSION OF A WIND POWER PLANT

(71) Applicant: Robert Bosch GmbH, Stuttgart (DE)

(72) Inventors: Martin Voss, Stuttgart (DE); Felix Hess, Ludwigsburg (DE); Ralf Schmidt, Gerlingen (DE); Jochen Fehse, Renningen (DE); Ulrich Vieth, Dortmund (DE)

(73) Assignee: Robert Bosch GmbH, Stuttgart (DE)

(*) Notice: Subject to any disclaimer, the term of this patent is extended or adjusted under 35 U.S.C. 154(b) by 48 days.

(21) Appl. No.: 13/722,198

(22) Filed: Dec. 20, 2012

(65) Prior Publication Data
US 2013/0160568 A1    Jun. 27, 2013

(30) Foreign Application Priority Data

Dec. 21, 2011   (DE) .......................... 10 2011 121 842

(51) Int. Cl.
*G01L 3/02*    (2006.01)
*G01D 5/14*    (2006.01)
*G01P 3/44*    (2006.01)

(52) U.S. Cl.
CPC ..... *G01D 5/147* (2013.01); *G01L 3/02* (2013.01); *G01P 3/44* (2013.01)
USPC ..................................................... 73/862.191

(58) Field of Classification Search
CPC ............. G01L 3/02; G01P 3/44; G01D 5/147
USPC ........................................................ 73/862.191
See application file for complete search history.

(56) References Cited

U.S. PATENT DOCUMENTS 5,867,092 A * 2/1999 Vogt .............................. 340/456

FOREIGN PATENT DOCUMENTS

DE           199 07 270 A1    8/2000
DE       10 2006 054 179 A1    5/2008

* cited by examiner

*Primary Examiner* — Lisa Caputo
*Assistant Examiner* — Brandi N Hopkins
(74) *Attorney, Agent, or Firm* — Maginot, Moore & Beck LLP

(57) ABSTRACT

A device for measuring the torque, the direction of rotation, and the speed of rotation of a shaft of a transmission, in particular an output shaft of an azimuth transmission, includes bands configured to be mounted in a fixed position on an outer circumference of the shaft. The bands are configured to be detected by measuring sensors and allow torsion of the shaft to be measured. Each of the measuring sensors has a Hall effect sensor, and the bands are respectively arranged at two different positions on the outer circumference of the shaft. Each of the bands includes polygonal apertures and/or depressions having webs located between the apertures and/or depressions. The webs are configured to be detected by the measuring sensors. A method includes operating the device to measure the torque, the direction of rotation, and the speed of rotation of the shaft.

12 Claims, 2 Drawing Sheets

DEVICE FOR MEASURING THE TORQUE, THE DIRECTION OF ROTATION AND THE SPEED OF ROTATION OF A SHAFT OF A TRANSMISSION, IN PARTICULAR AN OUTPUT SHAFT OF AN AZIMUTH TRANSMISSION OF A WIND POWER PLANT

This application claims priority under 35 U.S.C. §119 to patent application no. DE 10 2011 121 842.8, filed on Dec. 21, 2011 in Germany, the disclosure of which is incorporated herein by reference in its entirety.

BACKGROUND

The present disclosure relates to a device for measuring the torque, the direction of rotation and the speed of rotation of a shaft of a transmission, in particular an output shaft of an azimuth transmission of a wind power plant, in which bands can be mounted in a fixed position on an outer circumference of the shaft, which bands can be detected by measuring sensors and allow torsion of the shaft to be measured, wherein the measuring sensors each have a Hall effect sensor. The disclosure furthermore relates to a method for operating a device of this kind.

The area of application of the present disclosure extends particularly to azimuth transmissions for modern wind power plants. The area of application is not restricted to wind power plants, there being the possibility on many types of crane, for example, to rotate the boom about a vertical axis by means of a plurality of transmissions.

It is known from the general prior art that the nacelle on wind power plants is rotated in order to adjust the rotor to the wind direction. The rotor blades must also be rotated about the longitudinal axis thereof in order to set the correct blade position. In this case, very high frictional torques have to be overcome in the respective pitch and azimuth bearings.

Owing to the high torques required, hydraulic drives or electric drives can be used. In the case of the hydraulic drive, a hydraulic cylinder engages on an eccentric, for example, and thereby allows rotation. Here, however, the rotary movement is restricted to less than half a revolution. If larger rotary movements are to be carried out or if the use of a hydraulic solution is not desired for other reasons, an electric drive is used. In the case of electric drives, the high rotational speed of an electric motor is converted to a low rotational speed by means of a multi-stage transmission. The output pinion of the transmission engages in a gear ring, which is generally embodied as part of the bearing. The nacelle of the wind power plant can thereby be rotated.

If the required torques are very high, a plurality of drives is fitted. Defects, e.g. faulty bearings, can occur in the transmissions of the drives, causing a rise in the frictional torque in the transmission. As a result, the transmission outputs less torque to the gear ring for the same motor power.

If there is only a small number of drives, the motor power must increase in order to achieve the same drive torque. At the same time, the motor current also rises. By means of the rise in the current, which can be measured, it is possible to detect a fault in the transmission. If there is a very large number of drives, the rise in the motor current is so small that unambiguous measurement is not possible and therefore a fault cannot be detected. If the entire drive torque of the electric motor is lost in overcoming the friction in the faulty bearing, the output shaft of the transmission no longer drives the gear ring; instead, the output shaft is driven by the gear ring. Owing to the fault, the remaining drives and the transmissions thereof are overloaded and, in the long term, are likewise damaged.

DE 10 2006 054 179 A1 discloses a device for measuring the torque on a shaft, in particular for measuring the steering torque in a power-assisted rack and pinion steering system in a motor vehicle. The shaft is divided into an input shaft and an output shaft, with the two shaft parts being connected by a torsion element of reduced stiffness. The torsion element carries a magnetic transmitter unit, the coding of which can be modified by torsion and can be read out by a sensor unit assigned to the transmitter unit. However, a device of this kind for measuring the torque on a shaft is not suitable for torques of high magnitude of the kind that occur in azimuth transmissions of a wind power plant.

DE 199 07 270 A1 discloses a different device for measuring the torque on a shaft, in particular the output shaft of a motor vehicle transmission. Over a predetermined axial range, the shaft is provided with just one sleeve, which is connected to the shaft in such a way that torsion of the shaft leads to torsion of the sleeve. The sleeve is assigned a measuring arrangement for determining the magnitude of the torsion. Although measurement of the torque on a shaft can be achieved with this technical solution, it is a disadvantage of the known solution that only shafts of relatively small diameter, which exhibit a large amount of torsion within a relatively small shaft segment, can be measured. This device does not offer the possibility of precise measurement for small amounts of torsion.

SUMMARY

Starting from the abovementioned prior art, it is the object of the present disclosure to provide a device and a method for operating a device of this kind as a simple means of measuring high torques which twist the shaft only slightly owing to the shaft diameter and properties of the material.

The object is achieved on the basis of a device for measuring the torque, the direction of rotation, and the speed of rotation of a shaft. Advantageous developments of the disclosure will emerge from the dependent claims which follow.

According to the disclosure, one band is arranged at each of two different positions on the outer circumference of the shaft, each band comprising polygonal apertures and/or depressions, wherein there are webs between the apertures and/or depressions, which webs can be detected by means of measuring sensors. The bands are mounted on the outer circumference of the shaft in such a way that they cannot slip or twist. The material of which the bands or at least the webs of the bands are composed should be magnetizable, allowing the measuring sensors to detect the webs between the apertures and/or depressions from changes in the magnetic field, with the measuring sensors containing an integrated magnet which produces a magnetic field that is influenced by the webs. Measuring the webs by means of the change in the magnetic field proves particularly advantageous in the case of shafts running in an oil bath. It should be noted that a band that has a structure is not absolutely essential. The use of any markings, depressions and/or existing structures, e.g. those of a pinion, is possible.

According to a measure that adds a further improvement to the disclosure, it is proposed that the bands have at least one aperture and/or at least one depression, wherein the dimension of the aperture and/or the depression, as measured over the circumference of the band, is larger than the dimensions of the other apertures and/or depressions. By clearly distinguishing at least one aperture and/or one depression, it is possible to define a precise reference point. A pattern of apertures and/or depressions, with the aid of which precise determination of the position of the band is possible, is also conceivable.

In order to allow precise measurement of the torque, the bands preferably have a maximum spacing with respect to one another and each measuring sensor comprises at least two Hall effect sensors. A maximum spacing enables small torques on the shaft to be measured. The larger the spacing between the two sensors, the larger is the measured twisting of the shaft. In the case of shafts which exhibit only slight torsion, even at high torques, owing to their diameter or the properties of their materials, the spacing of the bands relative to one another can be used to increase the measured twisting of the shaft. Arranging at least two Hall effect sensors in each measuring sensor increases the accuracy with which the webs are detected.

One advantage of the solution according to the disclosure consists, in particular, in the fact that the shaft has shaft components such as a planet carrier and an input pinion, on which the bands can be mounted. The planet carrier is arranged on one end of the shaft, and the input pinion is arranged on the other end of the shaft. This allows an even larger spacing between the two bands, resulting in greater twisting of the shaft.

As another preferred option, the measuring sensors are arranged perpendicular to the bands and have a spacing of less than 5 mm with respect to the bands. Perpendicular arrangement of the measuring sensors ensures optimum detection of the webs, with a small spacing between the band and the sensor contributing to accuracy of measurement.

A method for operating the device for measuring the torque, the direction of rotation and the speed of rotation of the shaft is furthermore indicated, by means of which, for calibration of the measurement signal, the transmission is operated at a constant rotational speed under no load, wherein a reference web sequence resulting from the movement of the shaft is defined after the mounting of the bands on the shaft or on shaft components. Owing to production tolerances, the apertures and/or depressions have slightly different dimensions. During the one-time calibration, the spacing between the individual webs of the first measuring sensor and the webs of the second measuring sensor is defined.

The reference web sequence is preferably stored permanently as a calibration value in an electronic evaluation unit. For any comparison required as the method progresses, the previously measured reference web sequence is stored.

It is furthermore proposed that the direction of rotation of the shaft is determined by comparing the reference web sequence with the web sequence during operation of the transmission. If the measured sequence corresponds to the inverse sequence of the reference web sequence, the direction of rotation is negative. If there is no correspondence at all with the reference web sequence, a fault should be diagnosed.

It is furthermore preferred if a time shift in the web sequence of the two bands relative to one another is measured with torsional loading of the shaft during the operation of the transmission. This time shift in the web sequence indicates twisting of the shaft. The measured shift of the webs of the bands depends on the design of the shaft and the spacing of the bands relative to one another and, as a preferred option, can be in the double-digit millisecond range.

As a further optional proposal, the time shift in the web sequence is converted by means of the speed of rotation of the shaft into a local shift in the web sequence, and the transmitted torque of the shaft is calculated therefrom. The speed of rotation v of the shaft is determined from the time interval t between the webs of a band, using the following formula:

$$v=s/r/t$$

The physical distance between the flanks s and the radius r of the shaft or of the shaft components on which the band is arranged is assumed to be known.

Particularly in the case of a wind power plant which has a plurality of azimuth drives connected in parallel for rotating the nacelle, where each azimuth drive consists of an electric motor and an azimuth transmission, faulty azimuth transmissions can be identified on the basis of the significantly lower torque by comparing the measured torques on the output shafts of all the azimuth transmissions.

BRIEF DESCRIPTION OF THE DRAWINGS

Further measures that improve the disclosure are described in greater detail below, together with the description of a preferred illustrative embodiment of the disclosure with reference to the figures. In the drawings.

DETAILED DESCRIPTION

Figure 1:
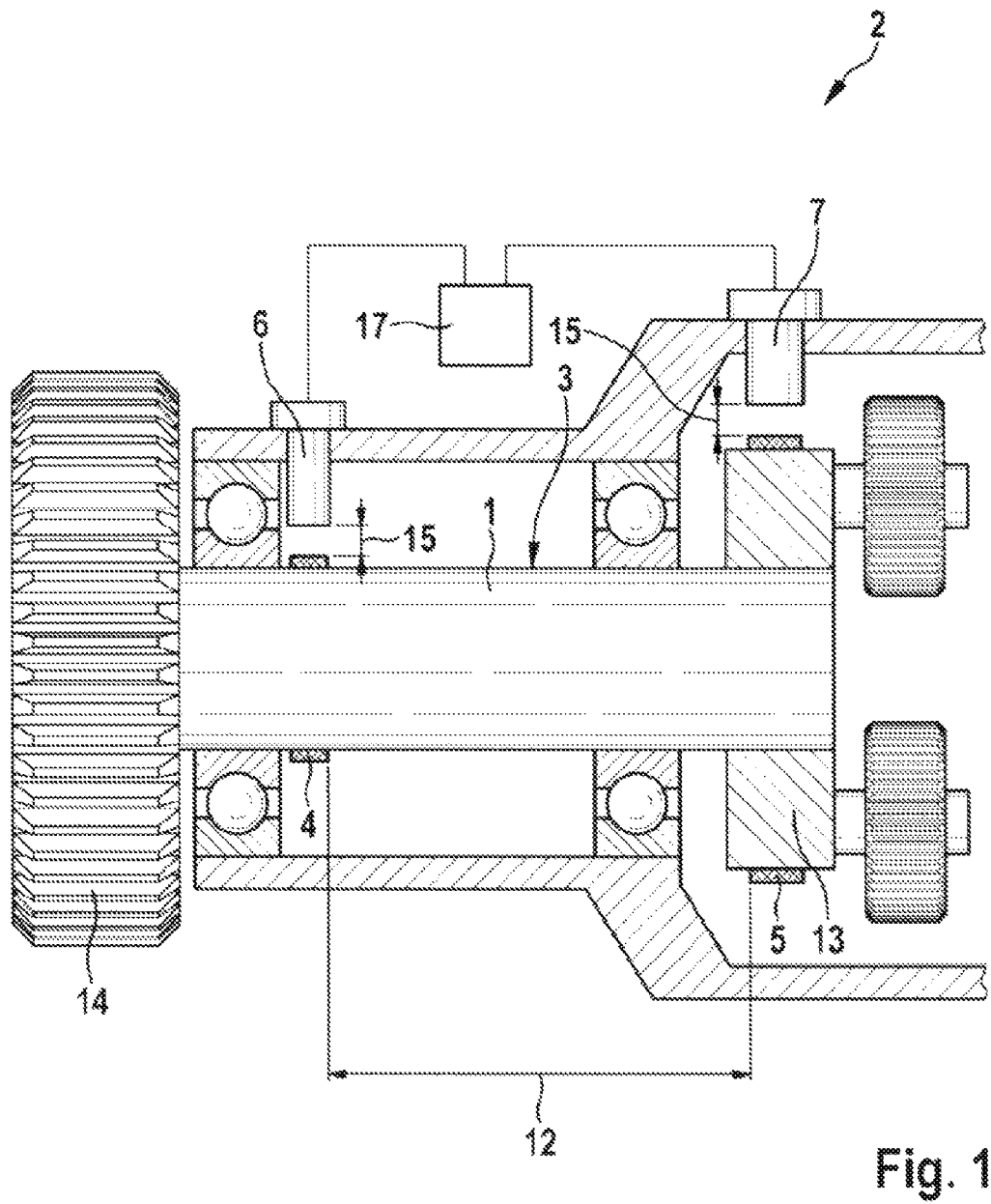
FIG. 1 shows a schematic sectional view through a transmission having a device for measuring the torque, the direction of rotation and the speed of rotation of a shaft.

According to FIG. 1, the device according to the disclosure for measuring the torque, the direction of rotation and the speed of rotation of a shaft 1 of a transmission 2 has two bands 4, 5, with a first band 4 being arranged on the outer circumference 3 of the shaft 1 and a second band 5 being arranged on a planet carrier 13. The bands 4, 5 are detected by measuring sensors 6, 7, which are arranged perpendicular to the bands 4, 5 and have a spacing 15 of less than 5 mm The measuring sensors 6, 7 record a signal emanating from the bands 4, 5. This signal is the web sequence of the respective band 4, 5 during the operation of the transmission 2 and is processed and stored in an electronic evaluation unit 17.

Figure 2:
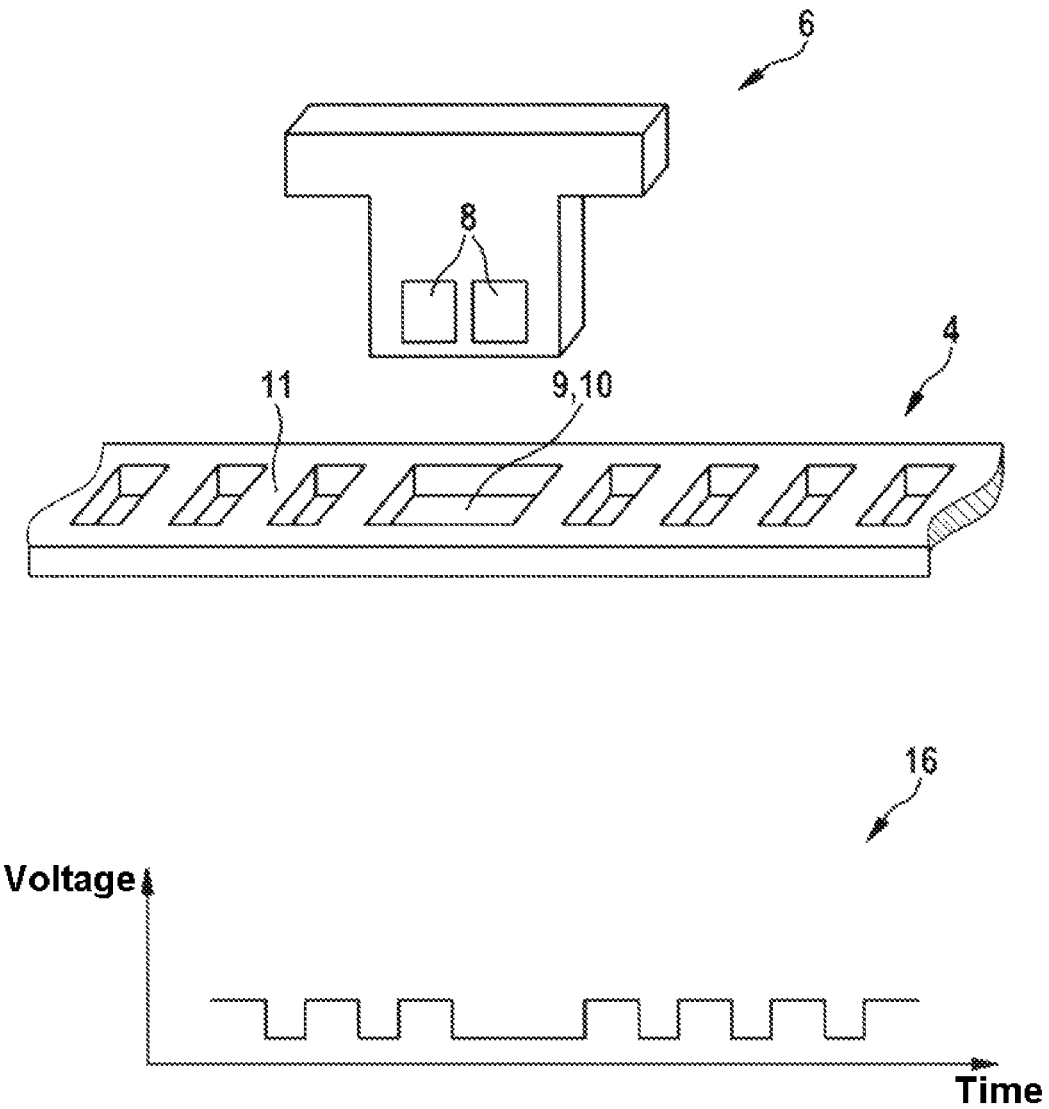
FIG. 2 shows an enlarged representation of a measuring sensor having two Hall effect sensors, under which a band having apertures and/or depressions is arranged, and a graph of the measurement of a reference web sequence, in which the voltage is plotted against time.

FIG. 2 shows one of the two measuring sensors 6, 7, which comprises two Hall effect sensors 8, with at least two Hall effect sensors 8 being required for precise signal detection. Band 4 has apertures 9 and/or depressions 10, there being webs 11 between two apertures 9 and/or depressions 10. One of the apertures 9 and/or one of the depressions 10, the dimension of which is larger than the dimensions of the other apertures 9 and/or depressions 10 is used to define a reference web sequence 16. The reference web sequence 16 of band 4 is indicated below the band.

The disclosure is not restricted to the preferred illustrative embodiment described above. On the contrary, modifications thereof are also conceivable, these being included in the scope of protection of the claims which follow. Thus, for example, it is also possible to arrange the first band 4 on the input pinion 14 in order to increase the spacing 12 between the two bands 4, 5. Moreover, it is also possible for markings to be applied to the shaft 1 and/or to shaft components 13, 14 or for existing structures, such as those of a pinion, to be used instead of bands 4, 5 having apertures 9 and/or depressions 10. Structuring of the shaft, preferably by means of a laser or by a cutting method, is possible.

In addition, it should be noted that "comprising" does not exclude any other elements or steps and "a" or "an" does not exclude a multiplicity. It should furthermore be noted that features or steps which have been described with reference to one of the above illustrative embodiments can also be employed in combination with other features or steps of other illustrative embodiments described above. Reference signs in the claims should not be interpreted as restrictive.

LIST OF REFERENCE SIGNS 1 shaft
2 transmission
3 outer circumference
4 first band
5 second band
6 first measuring sensor
7 second measuring sensor
8 Hall effect sensor
9 aperture
10 depression
11 web
12 spacing
13 planet carrier
14 input pinion
15 spacing
16 reference web sequence
17 electronic evaluation unit

What is claimed is:

1. A device for measuring torque, direction of rotation, and speed of rotation of a shaft of a transmission, comprising:
   measuring sensors each having a respective Hall effect sensor; and
   circumferential bands configured to be circumferentially mounted in a fixed position on an outer circumference of the shaft, the circumferential bands being configured to be detected by the measuring sensors and allowing torsion of the shaft to be measured,
   wherein at least one circumferential band is arranged at a first position on the outer circumference and at least one further circumferential band is arranged at a second position on the outer circumference that is different than the first position, each circumferential band defining one or more of polygonal apertures and depressions, and
   wherein webs are located between the apertures and/or the depressions and the webs on each circumferential band are configured to be detected by the measuring sensors.

2. The device according to claim 1, wherein the circumferential bands define at least one aperture and/or at least one depression having a dimension measured over the circumference of the circumferential band that is larger than the dimensions of the other apertures and/or depressions.

3. The device according to claim 1, wherein the circumferential bands have a maximum spacing with respect to one another, and wherein each measuring sensor comprises at least two Hall effect sensors to allow precise measurement of the torque.

4. The device according to claim 1, wherein the shaft has shaft components on which the circumferential bands are configured to be circumferentially mounted.

5. The device according to claim 1, wherein the measuring sensors are arranged perpendicular to the circumferential bands and have a spacing of less than 5 mm with respect to the circumferential bands.

6. A method for operating a device for measuring torque, direction of rotation, and speed of rotation of a shaft of a transmission, the device including measuring sensors each having a respective Hall effect sensor and circumferential bands configured to be circumferentially mounted in a fixed position on an outer circumference of the shaft, the circumferential bands being configured to be detected by the measuring sensors and allowing torsion of the shaft to be measured, wherein at least one circumferential band is arranged at a first position on the outer circumference and at least one further circumferential band is arranged at a second position on the outer circumference, the first and second positions being different from each other, wherein each circumferential band defines one or more of polygonal apertures and depressions, and wherein webs are located between the apertures and/or the depressions and the webs on each circumferential band are configured to be detected by the measuring sensors, the method comprising:
   circumferentially mounting the circumferential bands on the shaft or on shaft components;
   operating the transmission at a constant rotational speed under no load to calibrate the measurement signal; and
   defining a reference web sequence resulting from the movement of the shaft.

7. The method according to claim 6, further comprising permanently storing the reference web sequence as a calibration value in an electronic evaluation unit.

8. The method according to claim 6, further comprising comparing the reference web sequence with the web sequence generated during operation of the transmission to determine the direction of rotation of the shaft.

9. The method according to claim 6, further comprising measuring a time shift in the web sequence of the two circumferential bands relative to one another with torsional loading of the shaft during the operation of the transmission.

10. The method according to claim 9, further comprising:
    converting the time shift in the web sequence into a local shift in the web sequence by the speed of rotation of the shaft; and
    calculating the transmitted torque of the shaft therefrom.

11. The device according to claim 1, wherein the shaft is an output shaft of an azimuth transmission of a wind power plant.

12. The device according to claim 4, wherein the shaft components include a planet carrier and an input pinion.

* * * * *